United States Patent
Brauer et al.

(10) Patent No.: US 12,313,536 B2
(45) Date of Patent: May 27, 2025

(54) SYSTEMS AND METHODS OF AMBIENT GAS SENSING IN A VEHICLE

(71) Applicant: Joyson Safety Systems Acquisition LLC, Auburn Hills, MI (US)

(72) Inventors: Salvatore Brauer, Bloomfield, MI (US); Leonard Cech, Brighton, MI (US); Emil W. Ciurczak, Golden Bridges, NY (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 24 days.

(21) Appl. No.: 18/203,406

(22) Filed: May 30, 2023

(65) Prior Publication Data

US 2023/0408404 A1    Dec. 21, 2023

Related U.S. Application Data

(63) Continuation of application No. 17/224,046, filed on Apr. 6, 2021, now Pat. No. 11,692,933.

(Continued)

(51) Int. Cl.
  *G01N 21/3504*  (2014.01)
  *G01N 1/34*  (2006.01)
  *G01N 15/1434*  (2024.01)

(52) U.S. Cl.
  CPC ........... *G01N 21/3504* (2013.01); *G01N 1/34* (2013.01); *G01N 15/1434* (2013.01); *G01N 2201/0636* (2013.01)

(58) Field of Classification Search
  CPC .. G01N 21/3504; G01N 1/34; G01N 15/1434; G01N 2201/0636

(Continued)

(56) References Cited

U.S. PATENT DOCUMENTS 3,810,695 A  *  5/1974  Shea .................... G01N 21/05
                                                      356/73
4,943,159 A  *  7/1990  Oetliker ............... G01N 21/47
                                                      356/417

(Continued)

FOREIGN PATENT DOCUMENTS

CN    103674846        3/2014
CN    104272035 A  *  1/2015  .............. F24S 10/20

(Continued)

OTHER PUBLICATIONS

International Search Report and Written Opinion in PCT/US2021/026017. Mailed Jul. 23, 2021. 10 pages.

(Continued)

*Primary Examiner* — Mohamed K Amara
*Assistant Examiner* — Omar H Nixon
(74) *Attorney, Agent, or Firm* — Meunier Carlin & Curfman LLC

(57) ABSTRACT

An imaging system connected to an occupant monitoring system includes communications with an apparatus for measuring gas or airborne compound concentrations in a vehicle cabin. The apparatus includes a housing configured as a flow tube in fluid communication with ambient air in the vehicle cabin. A spectrometer is mounted within the housing and subject to ambient air flow through the housing, and the spectrometer is connected to a light source and receives reflected light from the air flow to detect by spectrum analysis the concentration of target gases and/or airborne compounds. The spectrometer identifies spectral changes in the light and reflected light within the ambient air flow. The spectrometer communicates with computerized vehicle control systems, and runs software stored to calculate the concentration of target gases and/or airborne compounds from the spectral changes.

9 Claims, 13 Drawing Sheets

Related U.S. Application Data

(60) Provisional application No. 63/005,942, filed on Apr. 6, 2020.

(58) Field of Classification Search
USPC .......................................................... 356/51
See application file for complete search history.

(56) References Cited

U.S. PATENT DOCUMENTS

| | | | |
|---|---|---|---|
| 6,770,488 B1 * | 8/2004 | Carron ............. | G01N 33/54313 |
| | | | 436/805 |
| 9,533,687 B2 | 1/2017 | Lisseman et al. | |
| 9,851,250 B1 | 12/2017 | Emadi et al. | |
| 10,084,975 B2 | 9/2018 | Kester et al. | |
| 10,113,954 B2 | 10/2018 | Hayashi et al. | |
| 10,611,335 B2 | 4/2020 | Cech et al. | |
| 10,730,465 B2 | 8/2020 | Naghizadeh et al. | |
| 2008/0252892 A1 | 10/2008 | Pralle et al. | |
| 2010/0079760 A1 | 4/2010 | Bernacki | |
| 2012/0097376 A1 * | 4/2012 | Lin ........................ | G03B 21/16 |
| | | | 165/121 |
| 2013/0237906 A1 * | 9/2013 | Park ........................ | A61B 5/24 |
| | | | 604/93.01 |
| 2015/0268158 A1 | 9/2015 | Laudo | |
| 2016/0327475 A1 * | 11/2016 | Hayashi ............. | G01N 21/3504 |
| 2018/0077363 A1 | 3/2018 | Kester et al. | |
| 2019/0021684 A1 | 1/2019 | Ruebel et al. | |
| 2020/0064291 A1 * | 2/2020 | Varganov ............. | G01N 27/227 |
| 2020/0225673 A1 | 7/2020 | Afrouzi et al. | |
| 2020/0294401 A1 * | 9/2020 | Kerecsen ............... | G08G 1/205 |

FOREIGN PATENT DOCUMENTS

| | | | | |
|---|---|---|---|---|
| CN | 209014539 U | * | 6/2019 | ............. F24S 10/20 |
| JP | 2001175969 | | 6/2001 | |
| KR | 1020110034330 | | 4/2011 | |

OTHER PUBLICATIONS

Jian, Kai-Syuan, et al. "High response CO sensor based on a polyaniline/SnO2 nanocomposite." Polymers 11.1 (2019): 184.

Jia, He, "Synthesis and applications of multifunctional hybrid materials based on microgel particles", Dissertation, 2016, 137 pages.

Liu, Chong, et al. "Optical fibre-based pulse oximetry sensor with contact force detection." Sensors 18.11 (2018): 3632.

Fourier-transform infrared spectroscopy, From Wikipedia, available on-line: https://en.wikipedia.org/wiki/Fourier-transform_infrared_spectroscopy Last updated Jun. 19, 2021.

Manley, Marena. "Near-infrared spectroscopy and hyperspectral imaging: non-destructive analysis of biological materials." Chemical Society Reviews 43.24 (2014): 8200-8214.

* cited by examiner

| VOC | AUTOMOTIVE OEM REQUIREMENTS µg/m³ | PROTOTYPE LIMIT OF DETECTION µg/m³ |
|---|---|---|
| FORMALDEHYDE | 100 | 2 |
| ACETALDEHYDE | 50 | 4 |
| TOLUENE | 300 | 24 |
| ETHYL BENZENE | 1000 | 24 |
| STYRENE | 220 | 31 |
| ACROLEIN | 50 | 12 |
| XYLENE | 870 | 40 |
| BENZENE | 30 | 20 |

*FIG. 9B*

SYSTEMS AND METHODS OF AMBIENT GAS SENSING IN A VEHICLE

CROSS REFERENCE TO RELATED APPLICATION

This application is a continuation of U.S. patent application Ser. No. 17/224,046, now U.S. Pat. No. 11,692,933, which claims priority to and incorporates by reference U.S. Provisional Patent Application Ser. No. 63/005,942 filed on Apr. 6, 2020, and entitled Laser Imaging of Gases for Concentration and Location Identification.

FIELD OF THE DISCLOSURE

This disclosure relates to systems and methods of using multi-spectral imaging systems, such as those having four sensitivity channels per pixel (red, green, blue, and infrared) in conjunction with a vehicle occupant monitoring system or another computer-implemented device to detect and identify gases present in an area of a vehicle, such as but not limited to a vehicle cabin.

BACKGROUND

Transmission spectroscopy has been used in astronomy for generations to analyze the chemical composition of remote stars and planets based on detecting and analyzing the spectrum of the received light at a detector on the earth. The same system has evolved for use in medicine, chemistry, physics, biology, manufacturing, quality control, and other fields.

Gas sensing technology has been commercially utilized to detect, classify and quantify gases in a confined area (for example the cabin of a vehicle), based on various sensing technologies. These technologies include, but are not limited to, pellistor, metal oxide, electrochemical, discrete wavelength infrared, and Fourier transform infrared (FTIR) using transmission spectroscopy.

More recently, multispectral imaging systems have been introduced which provide the capability to combine 2-D imaging with infrared spectra associated at each pixel. As such, the optical path from a point in space relative to the imaging system can be associated through light optics back to a pixel within the imaging system and include a range of images associated to a spectrum of light wavelengths.

Fewer measurements of gases in an area have been done mainly because the absorbances are much smaller than in a solution such as a con. The density, and therefore, the absorbance of a sample is more dependent on the temperature. "Proper" cells have developed slowly and many years after rules for solution spectroscopy were developed. Because of the dilute nature of the samples, gas analysis only lends itself to mid-range infrared ("MIR"). These MIR spectra are "rich," that is, they contain many peaks that, while good for "finger-printing" or identifying a sample, make quantification more difficult.

Currently there are no gas and/or odor detection devices using spectroscopy in the vehicle arena. In today's market most gas sensors use either metal oxide, electro chemical, or e-nose systems to measure specific particulates in the air. These sensors typically use a metal based material that changes in resistance when the target gas comes into contact (adsorbs) on the surface. These sensors use a lot of heat ($200°$ C.-$350°$ C.), have a very short life span, are very cross-contamination sensitive, and have long response and recovery time. This makes these types of sensors ill suited for a long term odor detection system in vehicle cabins.

A need continues to exist in the field of gas and odor detection and identification for systems, methods, and devices that take advantage of advancements in gas sensor developments, imaging technology, and combinations of the same.

BRIEF SUMMARY

Various implementations are directed to methods and systems for detecting gas concentration and gas location within numerous areas, both open and enclosed.

The details of one or more implementations of the disclosure are set forth in the accompanying drawings and the description below. Other features, objects, and advantages of the invention will be apparent from the description and drawings, and from the claims.

An apparatus for measuring gas or airborne compound concentration in an enclosure includes a flow tube in fluid communication with ambient air in the enclosure; a mounting plane connected inside the flow tube; a plurality of sensors mounted on at least one side of the mounting plane and exposed to ambient air flow through the flow tube, the sensors configured to detect the concentration of target gases and/or airborne compounds in the ambient air flow; and an air flow enhancement device connected to the flow tube.

A system for measuring gas or airborne compound concentration in a vehicle cabin has a 3D infrared time of flight camera having a field of view encapsulating at least a portion of a vehicle cabin and emitting light into the field of view and a processor communicatively coupled to a computerized memory. The 3D infrared time of flight camera collects image data comprising a 3D view from the field of view, wherein the 3D view is created by light reflected back to the 3D infrared time of flight camera from at least one of a vehicle occupant, a gas in the ambient air, or an airborne particle in the ambient air. The computerized memory comprises software that uses the image data to calculate identification data regarding the gas and/or airborne particles in the ambient air, and the processor is configured to transmit the identification data to a vehicle computer system.

A system for measuring target gases and airborne compound concentrations in a vehicle cabin includes at least one infrared light source illuminating the vehicle cabin with infrared light, a plurality of output devices collectively have at least one processor and computerized memory connected to a computerized vehicle control system, the output devices each defining a respective field of view through ambient air in the vehicle cabin. At least one of the output devices is a spectrometer identifying spectral differences between the infrared light from the light source and light arriving at the spectrometer, wherein at least one of the output devices is a camera collecting camera image data regarding the camera field of view.

A system for measuring gas or airborne compound concentrations in a vehicle cabin includes a housing configured as a flow tube in fluid communication with ambient air in the vehicle cabin. A spectrometer mounted within the housing and subject to ambient air flow through the housing emits light and receives reflected light from the air flow to detect the concentration of target gases and/or airborne compounds from spectral changes in the light and reflected light within the ambient air flow. At least one processor and computerized memory connects the spectrometer to a computerized vehicle control system, wherein the processor runs software stored in the computerized memory to calculate the concentration of target gases and/or airborne compounds from the spectral changes.

An apparatus for measuring gas or airborne compound concentration in an enclosure includes a gas analysis chamber in fluid communication with ambient air in the enclosure and receiving a gas sample. The apparatus includes a light source directing a light signal into the gas analysis chamber, a reflective surface inside the gas analysis chamber reflecting the light signal across multiple paths within the gas analysis chamber, and a light receiving device connected to an output of the gas analysis chamber in a position to receive connected to a computer that analyzes the incident output light to identify presence and/or properties of a target analyte.

An apparatus for measuring gas or airborne compound concentration in an enclosure includes a cylindrical gas analysis chamber in fluid communication with ambient air in the enclosure and receiving a gas sample. A light source directing a light signal into the cylindrical gas analysis chamber, a reflective surface inside the cylindrical gas analysis chamber reflecting the light signal across multiple paths within the cylindrical gas analysis chamber, a light receiving device connected to an output of the cylindrical gas analysis chamber in a position to receive incident output light from the cylindrical gas analysis chamber across the multiple paths, wherein the light receiving device is connected to a computer that analyzes the incident output light to identify presence and/or properties of a target analyte.

An apparatus for measuring gas or airborne compound concentration in an enclosure includes a cylindrical gas analysis chamber in fluid communication with ambient air in the enclosure and receiving a gas sample. A light source directs a light signal into the cylindrical gas analysis chamber, and a reflective surface inside the cylindrical gas analysis chamber reflects the light signal across multiple paths within the cylindrical gas analysis chamber. A light receiving device is connected to an output of the cylindrical gas analysis chamber in a position to receive incident output light from the cylindrical gas analysis chamber across the multiple paths, and the light receiving device is connected to a computer that analyzes the incident output light to identify presence and/or properties of a target analyte.

BRIEF DESCRIPTION OF THE DRAWINGS

Various implementations of the system are explained in even greater detail in the following exemplary drawings. The drawings are merely exemplary to illustrate the structure of the system and certain features that may be used singularly or in combination with other features. The invention should not be limited to the implementations shown.

FIG. 9B is a tabular representation of the constituents of FIG. 9A as compared to industry standards and sensor parameters according to this disclosure.

DETAILED DESCRIPTION

Figure 1:
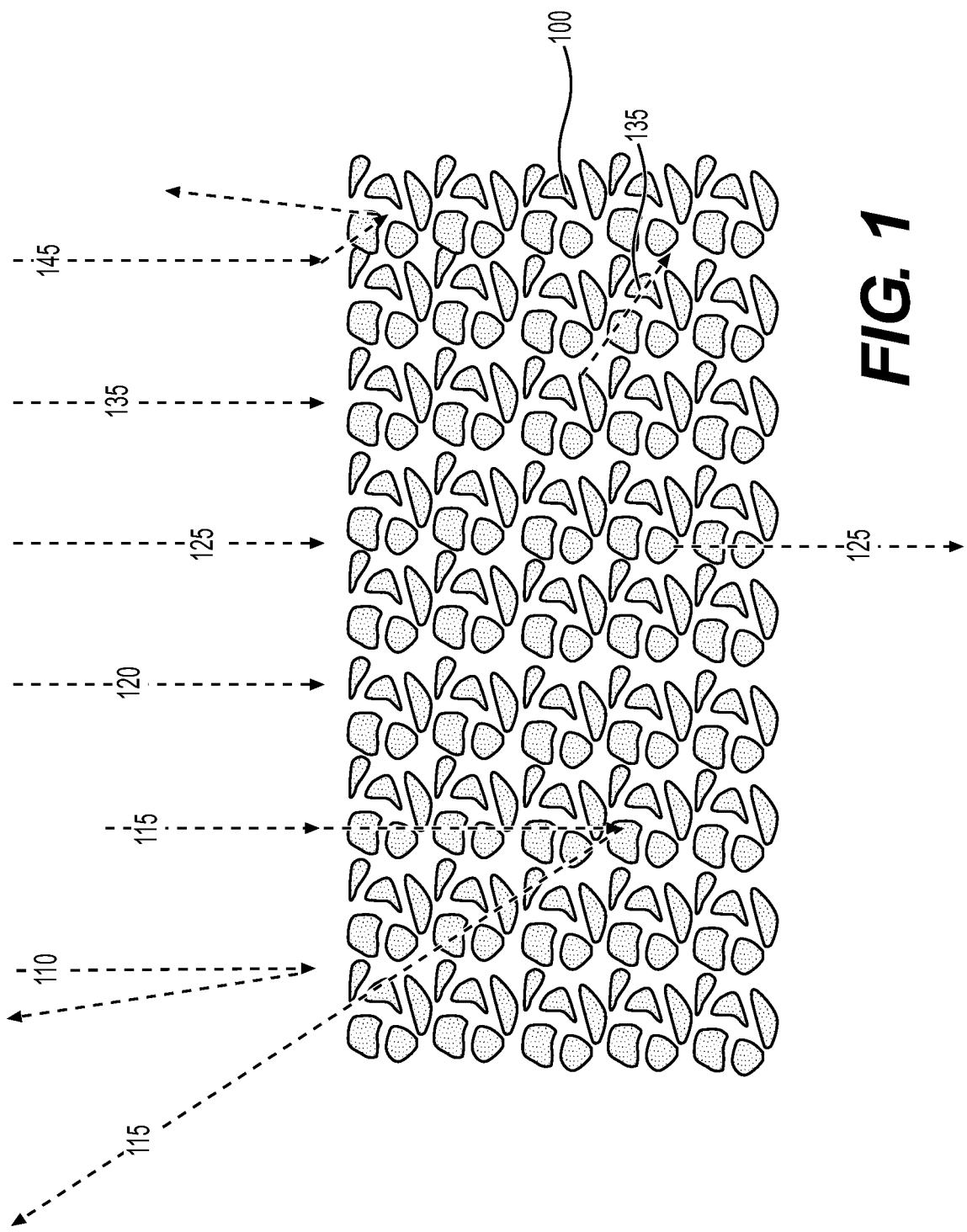
FIG. 1 is a schematic view of an area in a vehicle or other enclosure monitored for gas concentration with light and associated with a vehicle occupant according to embodiments of this disclosure.

Gas and odor sensing is becoming much more precise and more accurate as compared to previous years. A need continues to exist, however, for methods, systems and devices that take advantage of the components present in gases, as well as airborne particulate matter, causing chemical profiles that are detectable via electronic sensors and that have unique resonance responses to incident light. As discussed below, these properties allow for studies in an absorbance spectrum to show "what" and "how much" of a certain compound is within a sample (i.e., according to Beer's Law), and this disclosure further uses chemometrics to test for analyte specificity and sensitivity of a gas sample from an enclosure. The enclosures of this disclosure include but are not limited to occupant cabins of a vehicle.

The technologies used in the embodiments herein include both specialized sensors that are analyzed for electrical responses in the presence of gaseous components, as well as other sensors that are analyzed for optical/spectral responses in the presence of light. As discussed further below, variations on these fundamental technologies, i.e., hybrids, are being pursued for gas and odor detection and identification. These hybrids include the development of light sensors disclosed herein as well as micro-electro-mechanical sensors ("MEMs") which can be tailored to target compound(s). The MEMs sensors may be characterized through control of the sensor material(s), location of materials relative to each other, and quantity of material(s) relative to each other. Other non-limiting features of the sensors of this disclosure include methods of adhering materials relative to each other for special sensor shape characteristics (e.g. length, width, thickness, contours, layering) and inclusion of active energy elements. The active energy elements may function according to electrical gradient, active optical excitation, and/or thermal heating, each of which facilitates the sensing of respective target compounds through changes in voltage, current, and resistance. Such sensors have been enhanced through electro-mechanical, electro-chemical, and signal processing or algorithmic methods to improve performance. Inclusion of sensor elements targeting one or more target compounds in the sensor system has led to enhanced abilities for gas, particulate, and odor detection and identification.

Sensor performance can be enhanced through the location of the sensor (e.g. lower to detect compounds heavier than atmospheric air; higher to detect compounds lighter than atmospheric air), interface of the sensor to the source air (e.g., air entry port distance from sensor, air entry port size, air filtering mechanisms, air flow rates, exit port size, exit port distance). On the other hand, gas sensing technologies can also be adversely affected by non-target compounds in the air, which induce a sensor signal (interferents), or airborne compounds which electrochemically and/or electromechanically affect the sensor (e.g. coat the sensor surface or oxidize the sensor surface). The embodiments of this disclosure also address these issues.

Another alternative for gas, particulate, and/or odor detection and identification is a near infrared ("NIR") spectroscopic approach. Spectroscopy measures gas components by shining light through and measuring chemical effects on light properties. FIG. 1 illustrates how a gas sample 100 may have numerous effects on optical properties of light incident on the gas sample 100. In non-limiting embodiments, the light may encounter gas components and airborne particulate matter in the gas sample 100 and be subject to specular reflection 110, diffuse reflection 115, absorption 120, transmission 125, interactions and refraction 135, and/or scattering 145, to name a few. Because it is using light, the response and recovery times are fast. Every gas produces its own unique NIR spectrum that can be measured and predicted using chemometrics. Because the sensor is not heated there is a long shelf life and the sensor is much safer to handle in closed spaces.

Figure 2:
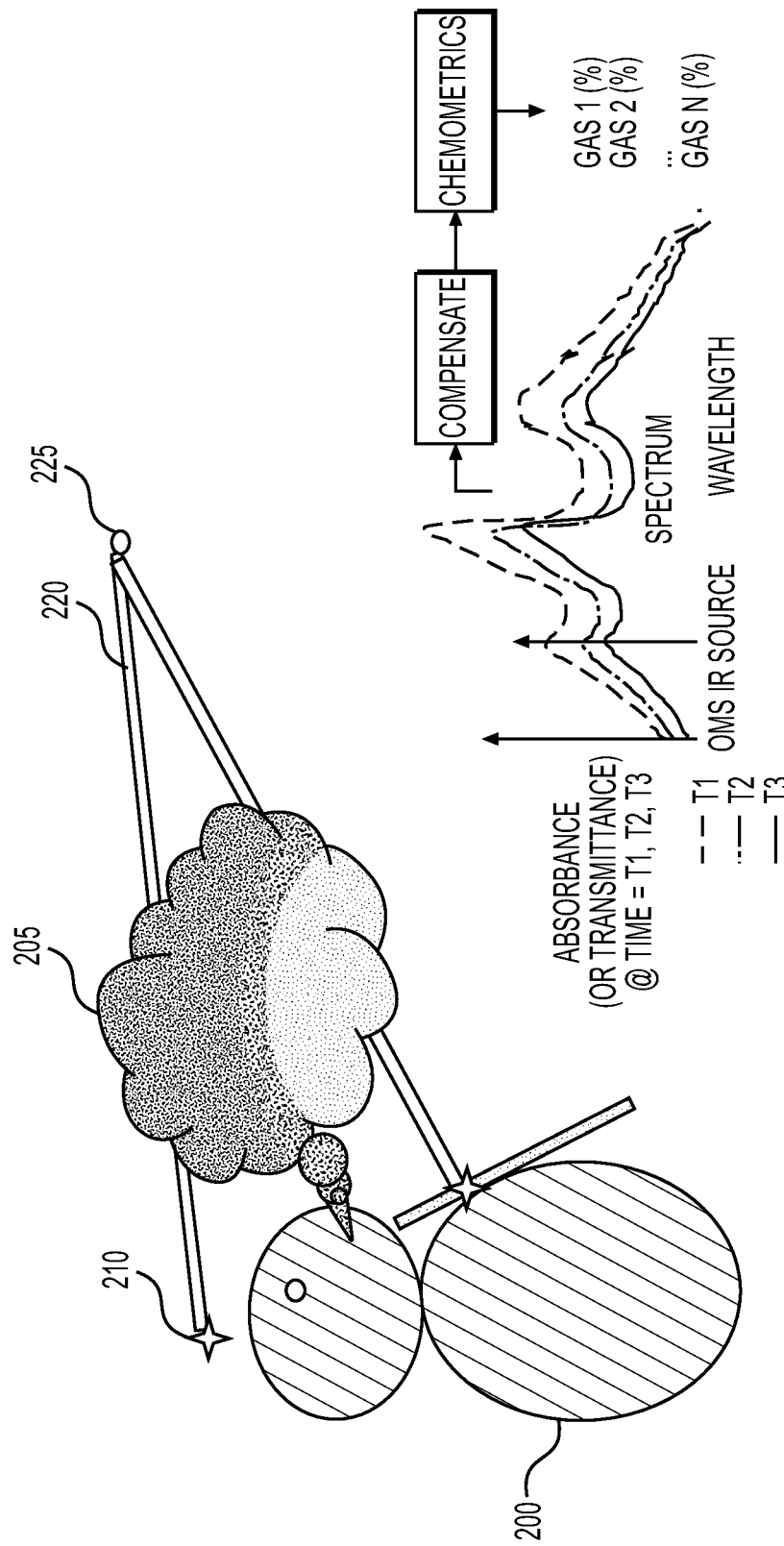
FIG. 2A is a schematic view of an area in a vehicle monitored for gas concentration associated with a vehicle occupant according to embodiments of this disclosure.
FIG. 2B is a schematic representation of a method of using spectroscopy to detect and identify gases and particulate content of an atmosphere within a vehicle cabin as disclosed herein.

FIGS. 2A and 2B show an example testing scenario and spectral analysis according to non-limiting embodiments of this disclosure. In the example of FIG. 2A, an occupant 200 in a vehicle cabin or other enclosure produces an enclosed gaseous environment 205, that is infiltrated with chemical compositions originating from either the occupant's body or another object, such as a cigarette or vaping device. Portions of the enclosed area can become a gas sampling region 220 in the presence of a light source 210 (e.g., an infrared light source) and a camera 225 (e.g., a three dimensional time of flight camera ("3D-TOF camera"). As illustrated in FIG. 2B, optical properties of light incident on the camera 225 through the gas sampling region 220 may be analyzed for gas identification. In the non-limiting embodiment of FIG. 2B, the gas sampling region is analyzed according to wavelengths present at the camera 225 for identification of absorbance or transmittance at numerous times T1, T2, T3. Associated electronics provide for programmed methods of processing images from the camera (i.e., the noted electronic compensation) and then subjecting the data to chemometric analysis for gas, particulate, and/or odor identification from spectral analysis.

In one embodiment illustrated in FIGS. 5A-5D, an easily replaceable gas sensor 501 attaches to or slots into the HVAC system in vehicles, including but not limited to the cold air intake vents directing air from the cabin back to the engine. Accordingly, the embodiments of FIGS. 5A-5D include intake vents 510 and output ports 515 for easy installation into a subject airflow. The system will either pull in or measure flow through air, either continuously or in intervals. To increase sensitivity, a long light path needs to be achieved, but must also account for the fact that space inside of vehicles is very limited. Using a device called a gas cell as in FIGS. 3 and 4 (toroidal or spherical respectively), the apparatuses of this disclosure can achieve greater light path lengths in smaller spaces. The light 315, 415 will be reflected between a toroidal reflector 301 or a spherical reflector 401 or two or more concave reflectors similar to the toroidal reflection sensor 301 of FIG. 3. These reflectors (including but not limited to mirrors) will reflect light one or more times increasing the effective path length of sample measurement, increasing the SNR (Signal to Noise Ratio) of the system. Associated electronics 505 allow for spectral analysis as discussed above.

Figure 3:
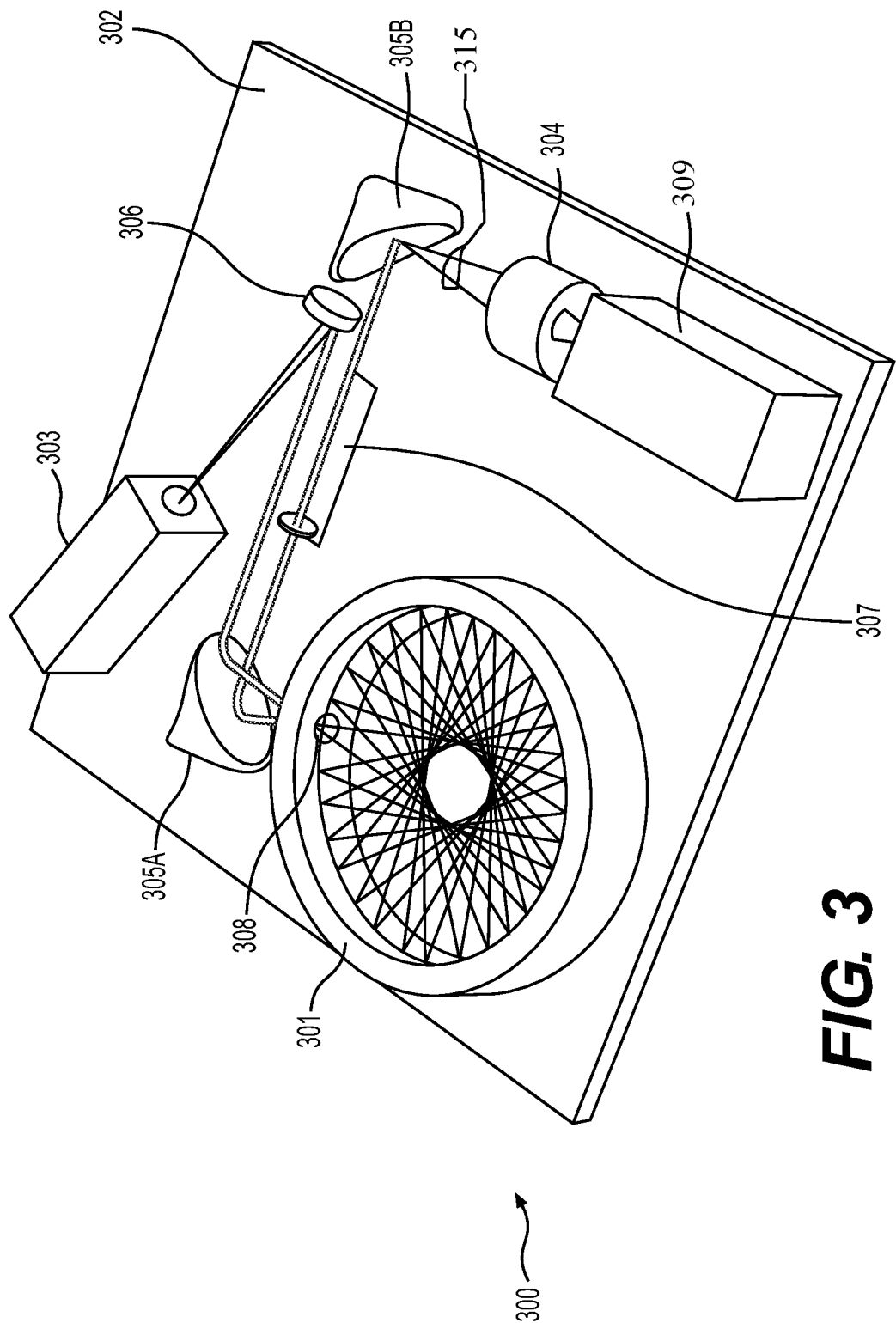
FIG. 3 is a perspective view of a spectrometer and/or other imaging device and gas sensor combination according to one embodiment of this disclosure.

Considering FIG. 3 in more detail, in one example embodiment, showing overall concepts of this disclosure, a gas sensor 300 includes a light source 309 that directs a light beam 315, including but not limited to infrared light, through a series of lenses and path adjustment reflectors shown as optical elements 304, 305A, 305B, 306, and 307 for directing the light beam into a light aperture 308 of a toroidal reflection sensor 301. The components of the gas sensor 300 may be mounted onto a substrate 302. The toroidal reflection sensor may have an interior coating of a reflective substance that allows for the above described light path extensions that increase the effective path length of the light beam 315 without overlap. These components may be supported by an associated substrate 302. In the non-limiting example of this disclosure, the light exits the same light aperture 308 and is directed to the camera 303. As noted above, the camera, as well as other components of the system of FIG. 3, may be connected to appropriate computerized hardware and software for spectral analysis. The spectral analysis allows for a chemometric identification of gaseous components, airborne particulates, and/or odors present in a gas sample within the sensor 301. FIG. 3, therefore, illustrates the light analysis hardware that is configured for use with corresponding computer implemented instructions to sample gases according to this disclosure. The sensors embodied in FIGS. 5A-5D may incorporate the optical components and computer technology of FIG. 3 and be used in accordance with the example of FIG. 2 for gas analysis.

Figure 4:
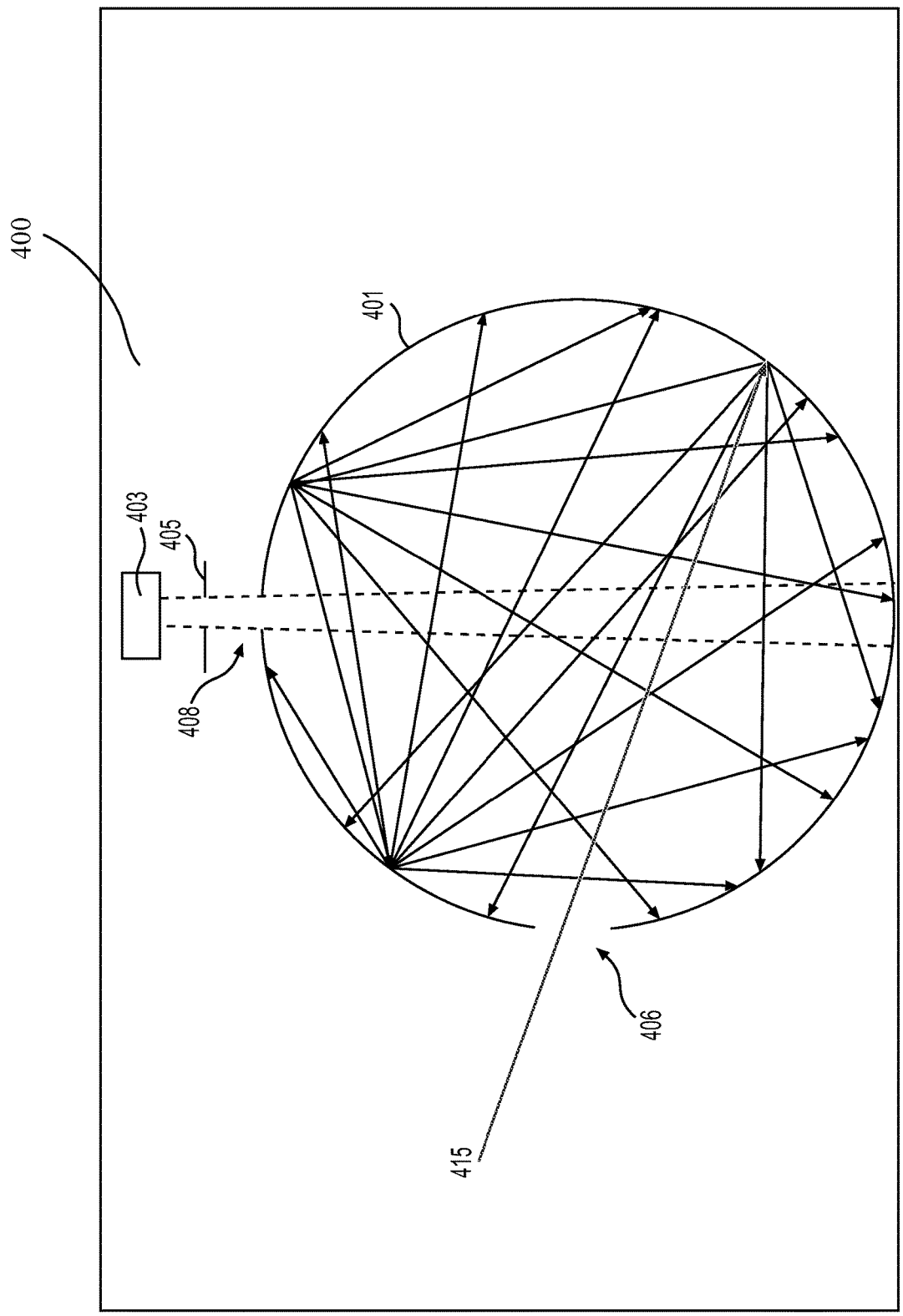
FIG. 4 is a top cross section view of a spectrometer and/or other imaging device and gas sensor combination according to this disclosure.
Figure 5B:
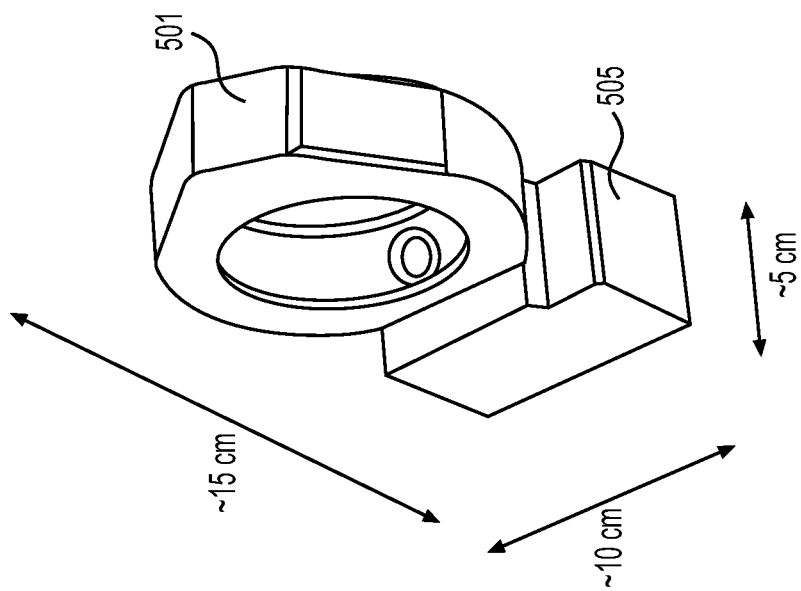
FIG. 5B is a perspective view of a sensor used for gas and particulate detection and identification according to the embodiments of this disclosure.
Figure 5A:
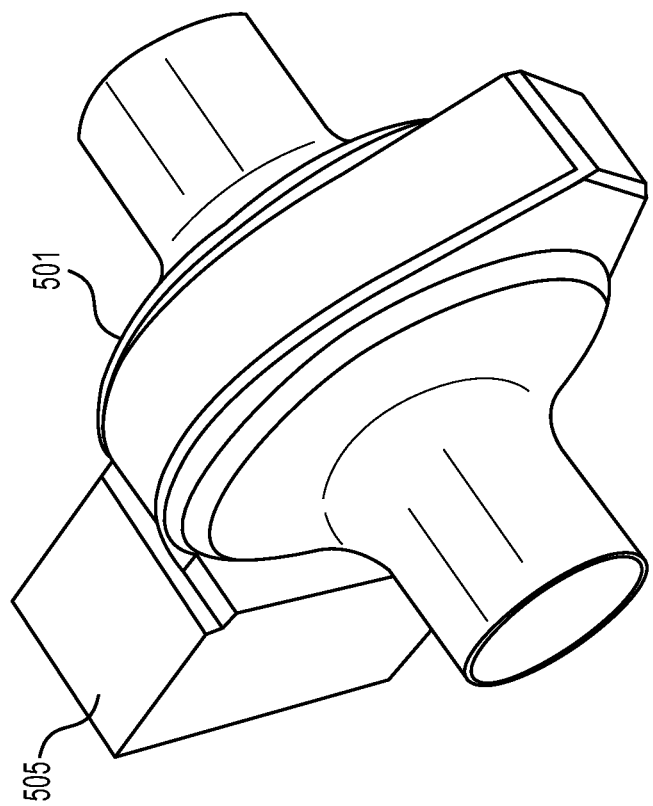
FIG. 5A is a perspective view of a sensor used for gas and particulate detection and identification according to the embodiments of this disclosure.
Figure 5D:
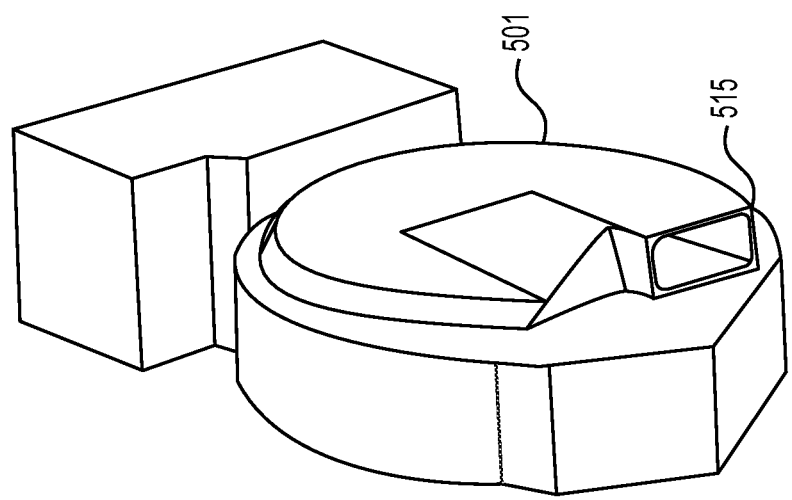
FIG. 5D is a perspective view of a sensor used for gas and particulate detection and identification according to the embodiments of this disclosure.
Figure 5C:
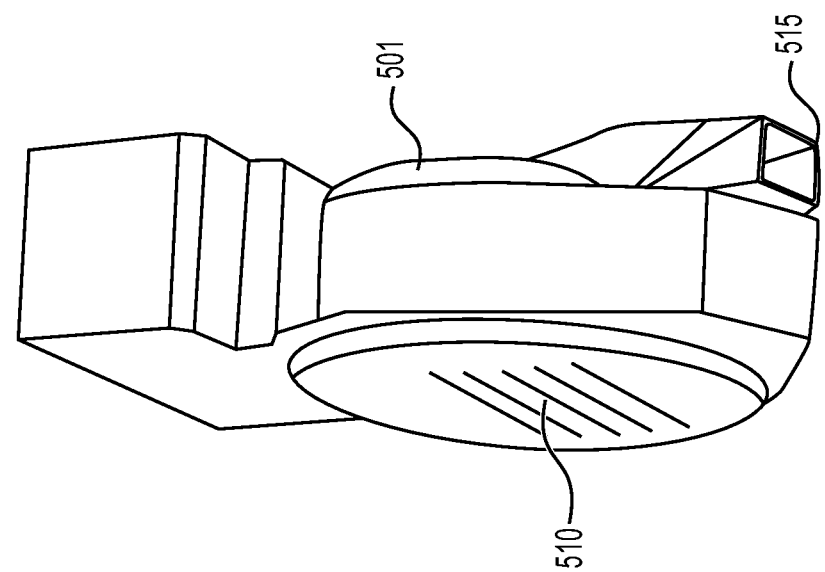
FIG. 5C is a perspective view of a sensor used for gas and particulate detection and identification according to the embodiments of this disclosure.
Figure 9A:
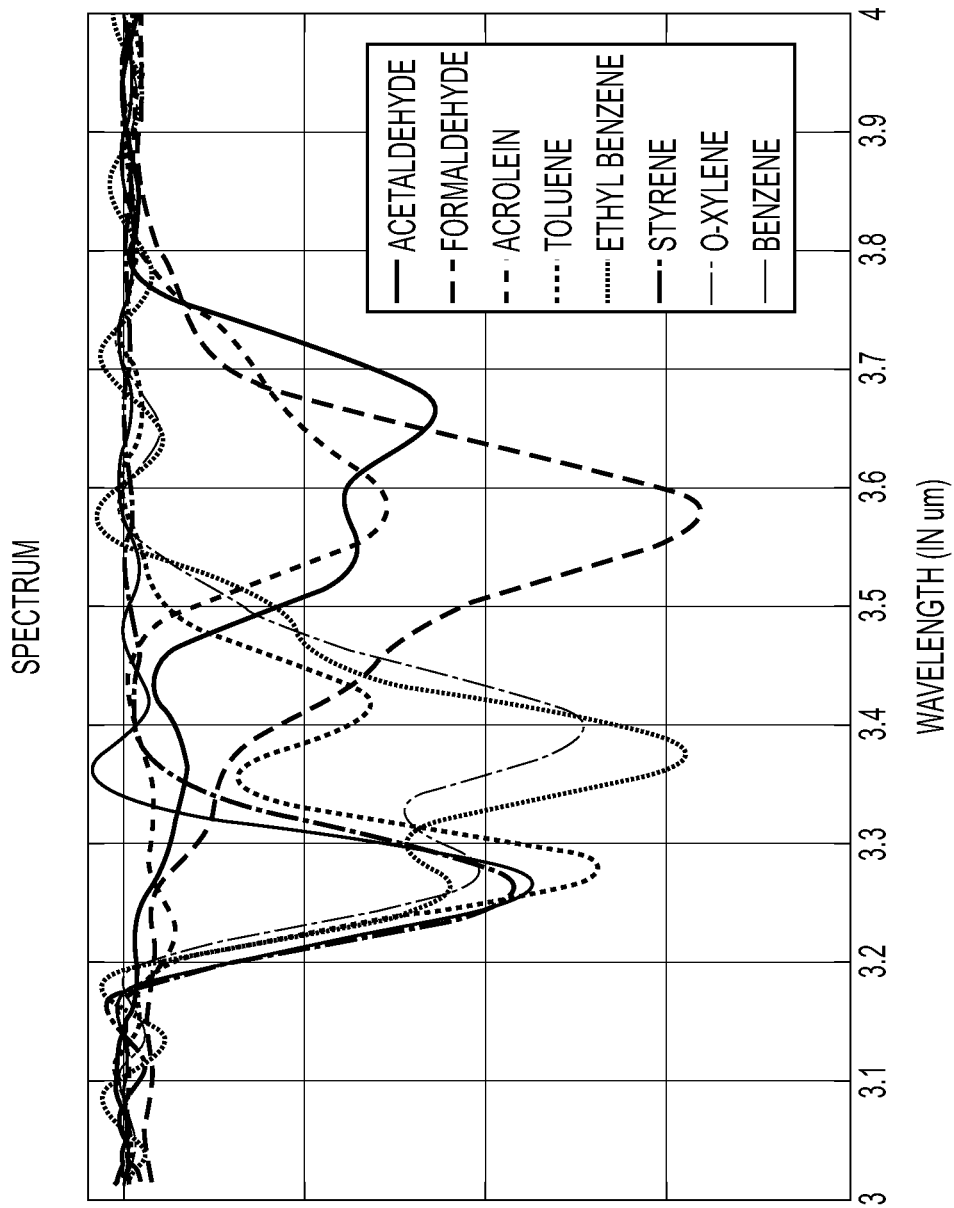
FIG. 9A is a graphical representation of respective wavelength spectra analyses for constituents of an example air sample according to embodiments of this disclosure.

FIG. 4 illustrates similar optical concepts of this disclosure in a spherical sensor system 400. The non-limiting example sensor of FIG. 4 may also be used to sample and analyze gases in an enclosed environment as set forth in FIG. 2. Although not shown explicitly, the spherical sensor system 400 may be connected to appropriate computerized systems, hardware, and software to complete the optical spectrum analysis as described above and shown in FIG. 2B. A spherical sensor element 401 may include a collection port 406 and a detection port 408 for an incoming ray of light 415 to respectively enter and exit the spherical sensor element 401. As noted above, a reflective surface within the spherical sensor element 401 (e.g., an integrating sphere) reflects the incoming ray of light 415 to produce a light output at the detection port 408 that has an increased light path distance for analysis within the spherical sensor element 401. As shown in FIG. 4, an output light beam is directed through an aperture 405 and optional optical elements such as those shown in FIG. 3 to be analyzed by a detector 403. The detector may be a camera, such as but not limited to a 3-D TOF camera, that receives the output light on a light sensitive array connected to an associated computer for spectral analysis. Gas components, airborne particulates, and even odors provide respective signature spectra for corresponding detection and identification. Examples are shown in FIGS. 9A and 9B.

The next issue that needs to be solved is airflow. The sensors needs to get air from the enclosure, such as a vehicle cabin directed into it for the best results. This airflow can be achieved numerous different ways. One non-limiting embodiment of this disclosure creates an attached pipe system that pulls in negative pressure air. Other optional embodiments create a valve system that forces air into the sensor. Without limiting this disclosure, the system may forcefully draw in air using a blower or a fan.

Temperature, pressure, and humidity also influence the system. At a minimum, there needs to be a way to control and/or compensate for these varying influences physically or chemometrically. Humidity can be removed through different types of desiccants or a condenser placed near the system. Chemometrically, embodiments of this disclosure can measure various concentrations of humidity and create a model to compensate or subtract out varying humidity. In addition, using a similar method, compensation methods for other discrete gases (e.g. carbon dioxide, $CO_2$) can be derived and then applied in chemometric methods. Similarly, in non-limiting embodiments of the disclosure, temperature may be controlled by ensuring that the sensor and air are scanned at the same temperature every time, or as often as possible. This will require a stabilization period, forcing scan times to be longer or create a model based on different temperatures. Barometric pressure can also be monitored and compensated with chemometrics.

A model will be derived off odor chemistry and chemometrics. Good odors will be separated from bad odors and will be separated from toxic odors. Most good smelling odors are alcohol and lactone based (*-anol, *-anal, and an *-2-ol groups). Bad smells are associated with carboxyilic acid, thiols, and amines.

In some instances, the systems of this disclosure needs to be calibrated every time the vehicle is started, so there needs to be a calibration reference readily available. There are at least three ways that the embodiments disclosed herein can be calibrated: 1. Send a calibration (i.e., a known) gas sample at a specific quantity through the system. 2. On the back of a shutter put a Spectralon® reflective coating visible in the infrared spectrum with known wavelength peaks. 3. Introduce an infrared wavelength specific diode directly into the sensor at a known intensity. Any of these individually or combined will give the sensor information to calibrate offset and background information.

Figure 10:
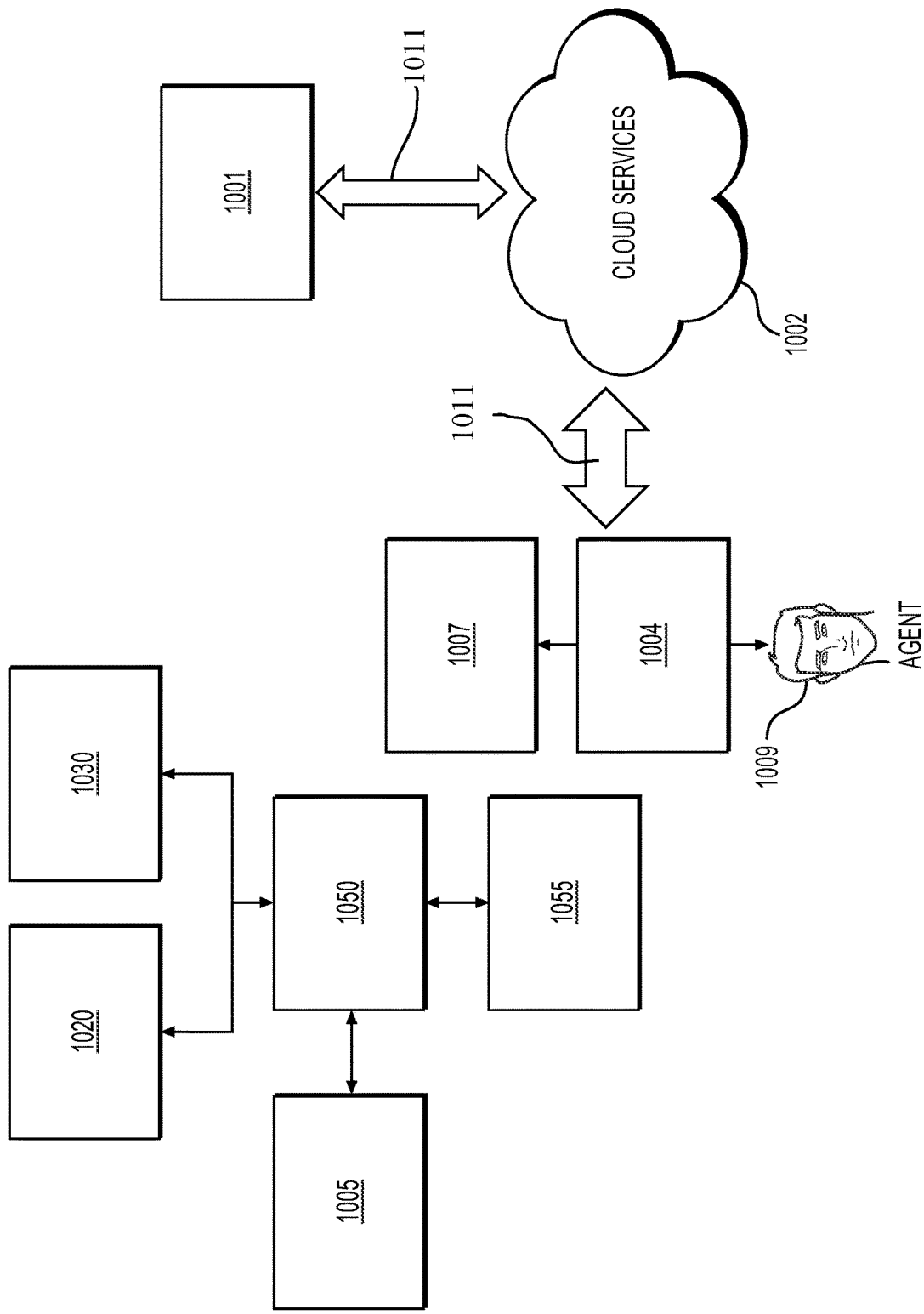
FIG. 10 is a flow chart of sensors of this disclosure as used in conjunction with vehicle control systems according to embodiments of this disclosure.

At least one non-limiting embodiment of this disclosure, illustrated for example in FIG. 10, shows a non-limiting way for a remote sensor 1005, including a multi-spectral array or an FTIR detector, to be co-located with a three dimensional time of flight ("3-D TOF") camera systems. In this way the sensors of this disclosure may be used alongside or with an occupant monitoring system 1050 so that the camera system detects, classifies and tracks human occupants and features (e.g. head, face, nose, mouth) or objects (e.g. location, size, shape, reflectivity properties) in three dimensional ("3-D") space relative to the camera. Accordingly, if the occupant monitoring system 1050 of FIG. 10 is used in the example scenario of FIG. 2, the occupant and object feature information can be used in a multi-spectral imager or FTIR measurement system, as described above, to determine the path length (as shown at 220 in FIG. 2) between the detector 225 and gas sampling regions 205 that are associated to the occupant 200 or other sensed objects. For example, the location and distance from the nose or mouth of an occupant can be used to derive gas sampling regions 205 which are associated to the exhaled air of the occupant. Similarly, a gas sampling region can be associated in 3-D space to a tracked object within the vehicle (e.g. a distance above the object center). In the example of FIG. 10, the occupant monitoring system ("OMS") 1050 may include computer systems, hardware, and associated vehicle control software for use with the gas sensors of this disclosure. The OMS provides sufficient processing power to adjust the vehicle operation, with or without occupant input, via certain sub-systems, including human-machine interfaces 1020 and/or automated controllers such as electronic controllers 1030 for autonomous vehicles. As illustrated in FIG. 10, the data collection and processing of this disclosure is configured for use over a bi-directional network 1011 to cloud based computer servers providing remote processing services 1002. The services may be incorporated into software 1001 for consolidated machine learning and chemometrics, gas prediction models and even software updates pushed to end users and vehicles over the network 1011. The sensors and the OMS incorporate appropriate computerized hardware, computer implemented instructions, and computer memory 1004 to implement both local and remote/cloud based data processing. In some implementations, the bi-directional network 1011 may connect occupants of a vehicle to a remote third party agent 1009 for instructions or situational awareness data for associated electronic services 1007. As illustrated, the system of this implementation includes communications hardware and software configurations 1055 for bi-directional communications.

In order to support the sensors and measurements described above, there is a need for a three dimensional (3-D), defined broad-spectrum, infrared (approximately, 700 nm<IR wavelength<10 um) light source between a FTIR sensor and a gas sampling region associated with the occupant or object feature (e.g. region associated to exhaled air from an occupant). Without limiting this disclosure, the light source can be positioned in any defined location relative to the known location of the 3-D TOF camera system. The camera system is within the confined 3-D space in which the occupant or object is contained (e.g. interior of a vehicle). For example, the light source could be positioned on a seatbelt webbing, or in a vehicle dome light or in other locations. The known location of the FTIR detector, light source, gas sampling region and target gas for detection can be used in the FTIR gas detection, classification and quantification process (e.g. the specific gas will dictate the chemical and physical properties; some gases will rise relative to gravity and others will fall, and some gases are chemically reactive, and others are inert). See FIG. 1 and FIG. 2.

In example embodiments, the 3-D TOF sensor uses modulated, narrow band infrared light sources (e.g. 850 nm or 940 nm+/−approximately 20 nm) to derive the distance and location of reflective surfaces within the scene. Other wavelengths are within the scope of this disclosure as well. The wavelengths of these lights also fall within the receiver band of the FTIR or multispectral imager and, therefore, can be used as a wavelength calibration reference in that system.

As a hypothetical example of one non-limiting implementation, an FTIR sensor system could be used to estimate the carbon dioxide ("$CO_2$") quantity over time for a vehicle occupant at a defined location within a vehicle. The same system and operation concept could be used to detect trace compounds within the exhaled air from an occupant (e.g. ethanol vapor, substances of abuse, or compounds which could be monitored over time to be associated with physiological health conditions). In the case of occupants, since they are moving continuously over time, the 3-D information available about the location and movement of the nose and mouth can be used to improve the accuracy and precision of the spectral components in the exhaled gas measurement process at any instant and over time. As a second hypothetical example, such a system could be used to detect and estimate a quantity of volatile compounds associated with an object in the vehicle. For example, volatile compounds can be identified that could be dangerous to life, property or operational efficiency of the contained space (e.g. a vehicle).

This disclosure includes using one or more deterministic infrared light sources (typically having a known location, intensity and spectrum) placed within a confined space with a multispectral imager/FTIR analyzer and 3-D TOF camera system to measure gases in the exhaled air of occupants or emanating from objects placed in the confined space. Without limiting this disclosure, co-locating the 3-D TOF camera and the spectral sensor, as discussed in conjunction with FIG. 10, allows real-time compensation of the transmission path to improve the gas sensing measurements. This disclosure further includes using the modulated light originating from a 3-D TOF camera and received by the FTIR or multi-spectral imager as a spatial, temporal or environmental sensor compensation reference, which can improve the accuracy and precision of the gas sensing measurements. The embodiments herein propose the integration of smoke and vapor detection using a 3D infrared time of flight camera. This camera is integrated into an occupant monitoring system (OMS) and in one non-limiting example operates with 940 nm infrared light. This operating frequency is selectable and may vary within +/−20 nm.

In one non-limiting embodiment, this disclosure accounts for the fact that there is currently no system in a vehicle that can detect smoke, whether it be from fire, cigarettes, vapor, or any other smoke source, whether visible or non-visible. Using the OMS camera discussed herein, smoke (both visible and non-visible) can be detected using near infrared (NIR) time of flight (TOF) technology.

Time of Flight, ("TOF") is a technology similar to sonar and lidar, in which the camera will emit light at a specific infrared wavelength at an object and calculate the time duration from emission to reflect off a surface back toward the camera and detection by the camera. This can effectively create a three-dimensional ("3D") space in front of the camera to produce accurate distances and classification down to +/−1 cm or less. Just like solid objects, cigarette smoke, water vapor, and other gases such as CO2, CO, EtOH, and many more, reflect back specific wavelengths of light, given high enough concentration. Smoke is often broadly defined as a gas that is emitted from a chemical reaction (e.g. combustion due to fire) absorbs some wavelengths of visible light and reflects other wavelengths (e.g. white, green, black, . . . smoke). When smoke or vapor enters the camera's field of view (FOV), the light will be reflected back, and smoke will be visible. However, any number of other chemical reactions that induce vapor but do not affect visible light wavelengths can still affect infrared wavelengths. Depending on how much smoke is positioned normal to the imaging sensor, the reflectivity of the gas (smoke or vapor) at the wavelength of the light source, and how quickly the smoke dissipates, precautionary measures can be taken. If the smoke is highly concentrated and blocks the sensor long enough to exceed a defined threshold, warning lights and indicators can warn the driver that it is not safe to drive the car and the smoke needs to be evacuated. If the smoke persists the vehicle can attempt to clear the cabin by opening windows and turning on the HVAC system. If this camera is implemented into a ride share type system without a driver it can be used to document cigarette or vape smokers in the vehicle. If the passenger smokes in the vehicle when it is not allowed, but the detectors are able to sense the smoking, the operator of the vehicle can apply warnings or countermeasures to the passenger. This can also signal to the vehicle's owner that the cabin is in need of cleaning and needs to be aired out before proceeding on to the next customer. This disclosure confirms that smoke can be detected with an infrared TOF camera, where the system detects cigarette use, fire, nicotine vapor and other airborne content.

Traditional IR sensors are praised for their ability to see through fog and smoke, and this is true of the camera systems described herein if only looking at intensity or grayscale images; however, with the inclusion of the 3D aspect to the camera, a cloud is visible due to the change in depth measurement. The system of this disclosure takes advantage of the partial reflectivity of the smoke, as the light passes through it. Although the light reflected back is small, it is enough to be detected and ranged properly by a camera. Inclusion of a gas detector (e.g., an electronic nose) can further be leveraged to improve algorithm quality and/or provide a confirmation signal of one or more target gases.

The FTIR sensor system and co-located camera system can provide derived information that could be used to support monitoring the containing space (e.g. vehicle cabin) or occupants within the space to enhance safety, comfort, convenience and target functional operations. For example, the FTIR derived information (e.g. gas detection and air quality sensor) can be monitored instantly or over time and used to implement connected systems associated with the confined space. The FTIR sensor system may communicate control data to an associated set of control systems, including but not limited to HVAC, air cleaning systems, air fresheners or chemical neutralizers, window opening operations, occupant health and wellness monitors, fire extinguishers, vehicle transmission, emergency service contacts, back-office analytics and a wide range of possible applications that benefit human mobility, health, comfort and wellness.

This disclosure also takes advantage of physical and electro-mechanical aspects of gas responses for analysis, particularly in the context of a vehicle cabin requiring detection and identification of gas components, airborne particulates, and even odors within the vehicle cabin. In certain non-limiting embodiments, some embodiments may utilize a White cell detector as one example of a gas analysis chamber for the purposes of this disclosure. There are, however, physical limits to a White cell in that keeping the cell small enough to fit within a car "living area" limits both the number of passes a light beam makes within the cell and the length of the cell (distance traveled by a simple pass). This combination limits the level of detection of any particular target analyte. Any attempt to manipulate end mirrors of a detector (from the theoretical optimum) to add passes could lead to constructive/destructive interference of the multiple photons within the cell at any time.

As discussed above in regard to FIG. 4, one solution to the limitations of the White cell is to implement the gas analysis chamber as an integrating sphere. A spherical cell would have several advantages over a linear cell. It would be smaller in length, allowing simpler installation, and since the volume increases by $V=4/3\pi r^3$, the volume of gas that can be collected increases by eight when the radius is doubled, while the volume of a cylinder ($V=\pi r^2 h$) merely doubles when the length (h) doubles. The effects of making the "r value" larger are more complicated, since the end mirrors need to be re-calculated and remade. If a larger cell volume is required (low gas concentrations), the tooling necessary to manufacture a larger sphere will be similar to the original, so engineering requirements for a larger cell are minimal. As mentioned previously, expanding a linear White cell requires more intense calculations and modification of the end mirrors to adjust for a longer cell length.

In short, a series of spherical cells could be more easily generated, yielding an ability to quickly determine the best size for the VOCs sought. The fastest and most reproducible manner of constructing the sphere would be with 3-D printing. It could be made in two halves and each sputtered (coated) with Spectralon® (sintered Teflon®) or gold or other reflectors and the two halves closed prior to installation. This manner of production would be both reproducible and inexpensive, particularly if the shells (sphere) are composed of a high-impact polymer, which would be less susceptible to temperature variations than metal or even glass. This disclosure should be read to include all manufacturing methods to create a sphere, even those that allow for single piece construction of the sphere with a sealable port for coating the interior with a reflective material.

In one non-limiting embodiment of this disclosure, high optical efficiency is used to increase path lengths through a gas sample to improve sensitivity to target gases. Path lengths of light transmitted through a target gas, within a contained space, must not overlap in the spatial domain, which greatly limits the available path length for a non-coherent light source. To address this issue, and as shown in FIGS. 3 and 4, this disclosure utilizes both cylindrical gas analytics chambers 301 as well as spherical gas analytics chambers 401 to test air content for a target gas. In some embodiments shown in FIG. 6, a cylinder sensor 600 could be extended into a spherical sensor element 601 to gain additional path length. A gas analysis chamber according to this disclosure, therefore, may have a structure formed of a plastic material and the gas analysis chamber interior includes a reflective coating so that a light signal has multiple paths through the gas for higher accuracy. In one embodiment, a circular shape of a reflective surface should provide uniform expansion/retraction through temperature changes that a gas analysis chamber may be subject to in operation. Regarding the interior reflective coating, an interior of the gas analysis chamber includes mirrored surfaces precisely placed to have minimal optical loss through the gas sample therein.

Figure 7:
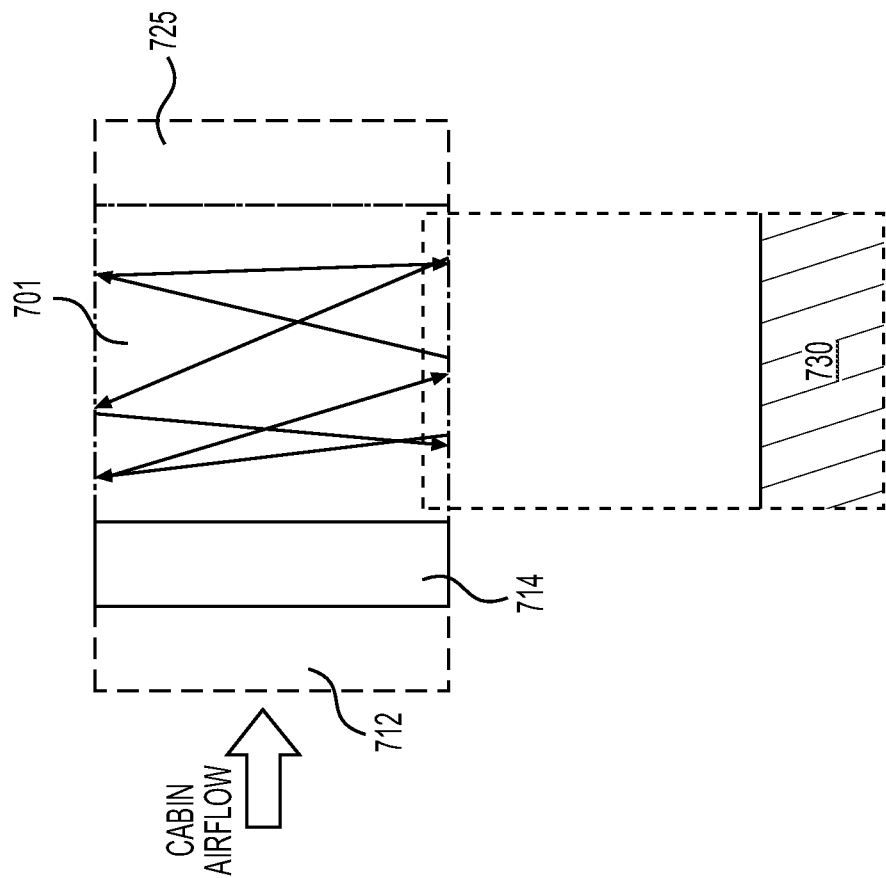
FIG. 7 is a side plan view of a schematic representation of a sensor and associated computerized electronics used for gas and particulate detection and identification according to the embodiments of this disclosure.
Figure 6:
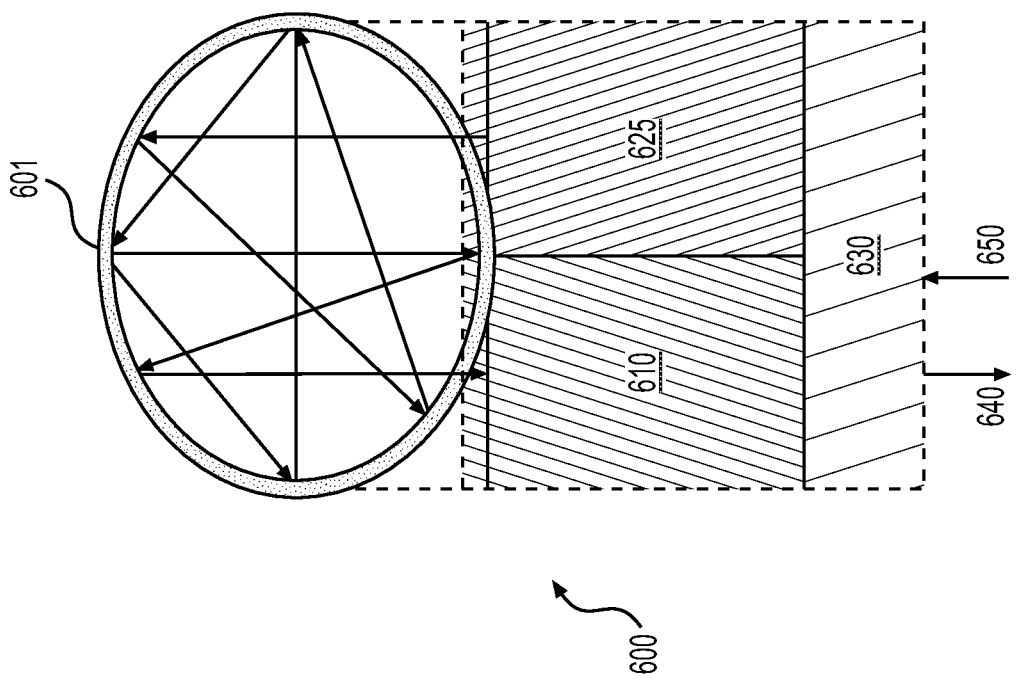
FIG. 6 is a front plan view of a schematic representation of a sensor and associated computerized electronics used for gas and particulate detection and identification according to the embodiments of this disclosure.
Figure 8:
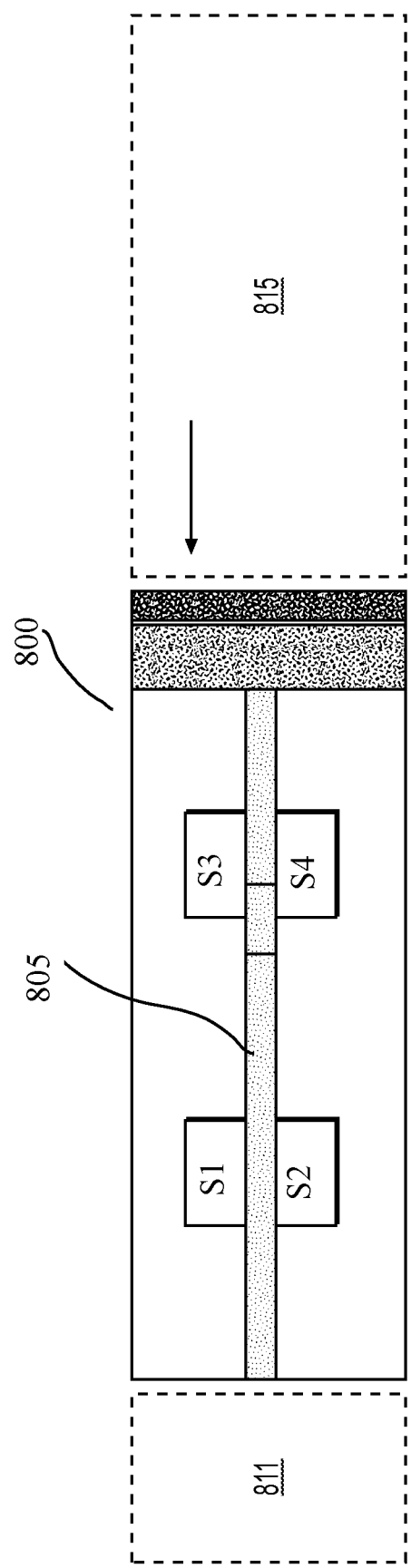
FIG. 8 is a cross section view of an air flow sensor assembly according to at least one embodiment of this disclosure.

The example of FIG. 6 incorporates options for creating hybrid versions of gas sensors 600 that utilize both physical, electromechanical responses of gas sample regions along with spectroscopy of incident light on the gas sample regions according to this disclosure. FIGS. 6 and 7, therefore, incorporate the light spectrum sensitivity of the sensors of FIGS. 3-5 with electro-mechanical sensors of FIG. 8 to add additional avenues for gas identification. Beginning with FIG. 8, the above-described MEMs sensors S1, S2, S3, S4 may be exposed to the gas sample region along a gas chamber 800 having a substrate 805 supporting the MEMs sensors. As described above, air flow can be promoted through the gas chamber 800 via pressure differentials, fans and blowers and other technology used to direct gas air samples across the MEMS of S1, S2, S3, S4. FIG. 8 illustrates that the air input structure 815 may be connected to both test gases and calibration systems 811 as described herein. Associated electronics and computer implemented software may be connected to the sensors S1-S4 for analysis according to sensed differentials in electrical and optical responses. In non-limiting embodiments, the plurality of sensors include photocatalytic micro-electro-mechanical sensors (MEMS), and the MEMS transmit the data to a processor to sense the target gases and/or airborne compounds concentration in the ambient air flow by detecting differentials in physical responses of the MEMS. The physical responses may include at least one of electrical gradients, degrees of active optical excitation, and heating gradients, among others.

FIGS. 6 and 7 of this disclosure may include hybrid sensor arrangements utilizing both the MEMs of FIG. 8 with the optical sensors of FIGS. 3-5. In FIG. 6, a bank 610 of MEMs sensors are co-located with a light source 625, and both are connected to shared electronics 630, such as electronics provided in an occupant monitoring system, or OMS, which has access to communications networks 640 and power sources 650. The sensor 600, therefore, receives air flow across both the MEMS 610 and then that air flow is subject to optical spectral analysis via the path extending integrating sphere 601. FIG. 7 is a side view of cabin air flow through a hybrid MEMs/optical sensor embodiment 701 and further includes appropriate physical filters 712, 714 for water vapor and carbon dioxide, respectively. The hybrid sensor of this disclosure is configured for use similar to that of FIG. 6 with associated electronics 730 and in some non-limiting embodiments, air flow enhancement devices 725 configured to ensure proper air flow through the sensor.

The embodiments of this disclosure set forth herein and shown in the associated figures allow for managing an effective light wave path length through a gas analysis chamber, calculated to account for multiple reflections off the internal reflective surface. Additional options include designing the gas analysis chamber and associated electronics to slide onto a sensor module with proper installation fixation points in an integrated sensor module. The gas analysis chambers of this disclosure include the potential to install analyte "filters" and those filters could be used to reduce/remove major absorbing chemicals (e.g., H2O, CO2) that skew analysis results. Example figures include, without limitation, a desiccant to remove water and/or lithium hydroxide to remove CO2. Removal of dominant absorbers can enhance sensitivity to target analytes.

The gas analysis chamber and associated electronics of this disclosure may work in conjunction with original equipment manufacturer gas sensors installed into cabin monitoring systems to detect/measure malodor (body odor, smoking . . . ), including when masked by neutralizers (e.g. fragrances). This unit can be positioned into part of an overall occupant monitoring system and installed in the vehicle headliner providing a suitable location to detect target gases.

Figure 11A:
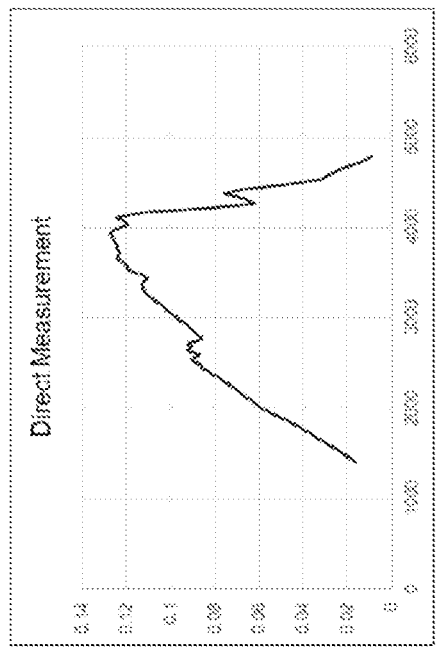
FIG. 11A is a plot of the spectral analysis of a directly measured gas composition plotted according to wavelength on the x-axis and micrograms per cubic meter on the y-axis according to embodiments of this disclosure.
Figure 11B:
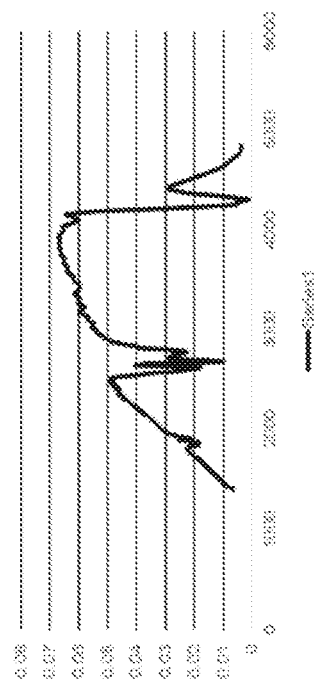
FIG. 11B is a plot of a corresponding spectral analysis, relative to the analysis of FIG. 11A, of a tested gas composition according to embodiments of this disclosure.

The figures of this disclosure show that the computerized systems described herein may be used to collect raw spectra data of optical sensors across wide range of available analytics). Physical sensors, such as MEMS, may be used in conjunction with the optical sensors. Machine learning chemometrics may enable consolidated gas prediction models developed in a back office to be applied to a set of test data either locally or across cloud networks. New models/functions can be pushed to the sensors via associated computer systems. Vehicle occupant monitoring systems of many vehicles in use may provide gas spectrometry, location, and concentration data for areas in the respective vehicles. Each OMS may be connected across any kind of network to primary communication servers and send the gas location and concentration data to a centralized location. The centralized servers may use the gas data to communicate back to the vehicle control systems or store the data in cloud servers. Such data collection provides valuable insight into vehicle users, activities in the vehicle, risks in the vehicle and numerous kinds of services that may be valuable. FIGS. 11A and 11B illustrate that directly measured control data of gases exposed to sensors of this disclosure provide spectral responses that are highly correlated to tested data with the sensors of this disclosure.

Embodiments of the above noted description include an apparatus for measuring gas or airborne compound concentration in an enclosure. A flow tube is in fluid communication with ambient air in the enclosure, and a mounting plane is connected inside the flow tube. A plurality of sensors is mounted on at least one side of the mounting plane and exposed to ambient air flow through the flow tube, the sensors configured to detect the concentration of target gases and/or airborne compounds in the ambient air flow. In some embodiments, an air flow enhancement device is connected to the flow tube to direct air flow across the sensors. In some embodiments, the mounting plane is a printed circuit board connecting the plurality of sensors to a power source, a processor, and computerized memory storing software that enables the processor to analyze data from the plurality of sensors and identify features of the target gases and/or airborne compounds present in the enclosure. The plurality of sensors may include photocatalytic micro-electro-mechanical sensors (MEMS), and wherein the MEMS transmit the data to the processor to sense the target gases and/or airborne compounds concentration in the ambient air flow by detecting differentials in physical responses of the MEMS. The physical responses include but are not limited to at least one of electrical gradients, degrees of active optical excitation, and heating gradients. In some embodiments, the flow tube defines windows allowing incoming light to enter the flow tube, and the MEMS are photocatalytic MEMS providing the processor with data directed to changes in photoconductivity of the sensors in the presence of target gases. The air flow enhancement device may be a fan forming a positive or negative pressure in the flow tube. In other embodiments, the air flow enhancement device includes a heat source connected to an end of the air flow tube, inducing convection air flow through the air flow tube. The air flow enhancement device may, conversely, include a cooling device connected to an end of the air flow tube, inducing convection flow through the air flow tube. The plurality of sensors and the processor are further connected to a vehicle accessory control system, an occupant monitoring system, and/or a neutralizer deployment system. Some embodiments include an air filter proximate an inlet of the air flow tube.

In a system for measuring gas or airborne compound concentration in a vehicle cabin the system may include a 3D infrared time of flight camera having a field of view encapsulating at least a portion of a vehicle cabin and emitting light into the field of view. A processor may be communicatively coupled to a computerized memory, wherein the 3D infrared time of flight camera collects image data comprising a 3D view from the field of view. The 3D view is created by light reflected back to the 3D infrared time of flight camera from at least one of a vehicle occupant, a gas in the ambient air, or an airborne particle in the ambient air. The computerized memory in communication with the system components includes software that uses the image data to calculate identification data regarding the gas and/or airborne particle in the ambient air. The processor is configured to transmit the identification data to a vehicle computer system.

The system embodiments of this disclosure may include a 3D infrared time of flight camera that emits light in the near-infrared light range. The 3D infrared time of flight camera may be configured to emit light at about 940 nm. The vehicle computer system uses the identification data to trigger at least one remedial action for neutralizing the presence of the gas and/or airborne particle in a vehicle cabin.

In another embodiment of the system of sensors, at least one infrared light source illuminates the vehicle cabin with infrared light. A plurality of output devices collectively include at least one processor and computerized memory connected to a computerized vehicle control system, and the output devices each define a respective field of view through ambient air in the vehicle cabin. In one preferred embodiment, at least one of the output devices is a spectrometer identifying spectral differences between the infrared light from the light source and light arriving at a spectrometer. At least one of the output devices may be a camera collecting camera image data regarding the camera field of view. The spectrometer may be a multispectral infrared imager that uses software to direct the processor to analyze, simultaneously, spectral data arriving at a plurality of pixels in the multispectral imager. The spectrometer adjusts a spectrometer field of view in response to movement of target images collected by the camera. The multispectral infrared imager analyzes respectively distinct spectral data at each of the pixels at a plurality of times within a time period. In these non-limiting embodiments, the 3D time of flight camera operates within a range of wavelengths and is tuned to match the operating wavelengths of the multispectral infrared imager. The processor communicates identification data regarding gases and airborne compounds in the vehicle cabin to the computerized vehicle control system, and the computerized vehicle control system triggers pre-programmed environmental response steps inside the vehicle cabin. The environmental response steps may include, but are not limited to visible and/or audible alerts for vehicle occupants, operation of vehicle windows, operation of vehicle HVAC options, and/or application of fragrances, air fresheners, or air cleansing procedures within the vehicle.

In another embodiment, a system for measuring gas or airborne compound concentrations in a vehicle cabin includes a housing configured as a flow tube in fluid communication with ambient air in the vehicle cabin. A spectrometer is mounted within the housing and subject to ambient air flow through the housing, the spectrometer emitting light and receiving reflected light from the air flow to detect the concentration of target gases and/or airborne compounds from spectral changes in the light and reflected light within the ambient air flow. At least one processor and computerized memory connects the spectrometer to a computerized vehicle control system, wherein the processor runs software stored in the computerized memory to calculate the concentration of target gases and/or airborne compounds from the spectral changes. In one non-limiting embodiment, the software is a partial least squares regression modeling software. Some embodiments may include an air flow enhancement device comprising at least one of a fan, a heat source, or a cooling element connected to at least one end of the housing. The air flow enhancement device may in ensure proper air flow through various sensors via pressure differentials, inductive air flow, and the like.

In one non-limiting apparatus embodiment for measuring gas or airborne compound concentration in an enclosure, the apparatus includes a gas analysis chamber in fluid communication with ambient air in the enclosure and receiving a gas sample. A light source directs a light signal into the gas analysis chamber. A reflective surface inside the gas analysis chamber reflects the light signal across multiple paths within the gas analysis chamber. A light receiving device is connected to an output of the gas analysis chamber in a position to receive connected to a computer that analyzes the incident output light to identify presence and/or properties of a target analyte. In some embodiments, the gas analysis chamber is a White cell, and the light source is an infrared light source.

Non-limiting embodiments of this disclosure further include a spectrometer as a light receiving device. The spectrometer may be a MEMS spectrometer, a photodetector, or similar electronic analyzer. In one embodiment, the light receiving device is an array of photodetectors producing an image of the target analyte in the gas analysis chamber. In optional embodiments, an inlet filter is positioned within the air flow and removes malabsorptive sample components from the gas sample. The malabsorptive sample may be, for example, water vapor or carbon dioxide.

Other example apparatuses for measuring gas or airborne compound concentration in an enclosure may include a cylindrical gas analysis chamber in fluid communication with ambient air in the enclosure and receiving a gas sample. A light source directs a light signal into the cylindrical gas analysis chamber. A reflective surface inside the cylindrical gas analysis chamber reflects the light signal across multiple paths within the cylindrical gas analysis chamber. A light receiving device is connected to an output of the cylindrical gas analysis chamber in a position to receive incident output light from the cylindrical gas analysis chamber across the multiple paths. The light receiving device is connected to a computer that analyzes the incident output light to identify presence and/or properties of a target analyte. The reflective surface may be at least one mirror in a path of the light source. The reflective surface is a coating on an inside wall of the cylindrical gas analysis chamber.

An apparatus according to this disclosure is for measuring gas or airborne compound concentration in an enclosure. The apparatus includes a spherical gas analysis chamber in fluid communication with ambient air in the enclosure and receives a gas sample therein. A light source directs a light signal into the spherical gas analysis chamber. A reflective surface inside the spherical gas analysis chamber reflects the light signal across multiple paths within the spherical gas analysis chamber. A light receiving device connects to an output of the spherical gas analysis chamber in a position to receive incident output light from the spherical gas analysis chamber across the multiple paths, wherein the light receiving device is connected to a computer that analyzes the incident output light to identify presence and/or properties of a target analyte. The reflective surface may be at least one mirror in a path of the light source. The reflective surface may be is a coating on an inside wall of the cylindrical gas analysis chamber.

Figure 12:
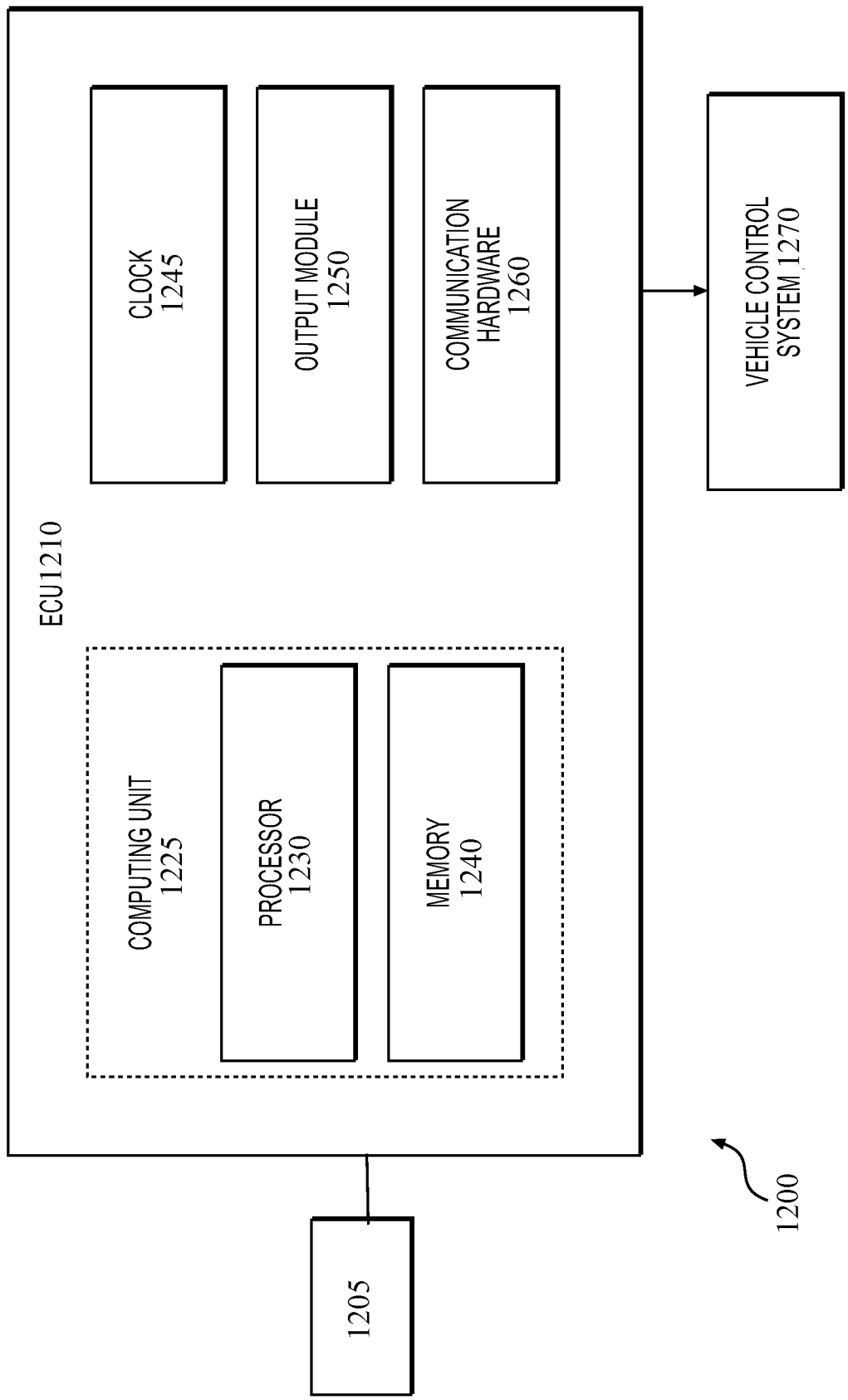
FIG. 12 is a schematic illustration of a computer environment of embodiments of this disclosure.

Implementations described above and in relation to FIGS. 1 through 11B may be used with equipment that implements computerized methods that are activated with an electronic control unit ("ECU") 1200 in electronic communication with a sensor 1205 as described herein. In particular, the described equipment, including imaging apparatuses and spectrometers, communicate with a computer processor configured to process one or more characteristics and/or profiles of the electrical signals received. By way of example and without limiting this disclosure to any particular hardware or software, FIG. 12 illustrates a block diagram of a system herein according to one implementation.

The ECU 1200 may include a computing unit 1225, a system clock 1245, an output module 1250 and communication hardware 1260. In its most basic form, the computing unit 1225 may include a processor 1230 and a system memory 1240. The processor 1230 may be a standard programmable processor that performs arithmetic and logic operations necessary for operation of the sensor system 1200. The processor 1230 may be configured to execute program code encoded in tangible, computer-readable media. For example, the processor 1230 may execute program code stored in the system memory 1240, which may be volatile or non-volatile memory. The system memory 1240 is only one example of tangible, computer-readable media. In one aspect, the computing unit 1225 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 1230 the machine becomes an apparatus for practicing the disclosed subject matter.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the vehicle computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. An apparatus for measuring gas or airborne compound concentration in an enclosure, comprising:
    a flow tube in fluid communication with ambient air in the enclosure;
    a mounting plane connected inside the flow tube;
    a plurality of sensors mounted on at least one side of the mounting plane and exposed to ambient air flow through the flow tube, the sensors configured to detect the concentration of target gases and/or airborne compounds in the ambient air flow; and
    an air flow enhancement device connected to the flow tube;
    wherein the mounting plane is a printed circuit board connecting the plurality of sensors to a power source, a processor, and computerized memory storing software that enables the processor to analyze data from the plurality of sensors and identify features of the target gases and/or airborne compounds present in the enclosure;
    wherein the plurality of sensors comprises photocatalytic micro-electro-mechanical sensors (MEMS), and wherein the MEMS transmit the data to the processor to sense the target gases and/or airborne compounds concentration in the ambient air flow by detecting differentials in physical responses of the MEMS; and
    wherein the flow tube defines windows allowing incoming light to enter the flow tube, and the MEMS are photocatalytic MEMS providing the processor with data directed to changes in photoconductivity of the sensors in the presence of target gases.

2. The apparatus according to claim 1, wherein the enclosure is a vehicle cabin.

3. The apparatus of claim 1, wherein the physical responses comprise at least one of electrical gradients, degrees of active optical excitation, and heating gradients.

4. The apparatus of claim 1, wherein the air flow enhancement device is a fan forming a positive or negative pressure in the flow tube.

5. The apparatus of claim 1, wherein the air flow enhancement device comprises a heat source connected to an end of the air flow tube, inducing convection air flow through the air flow tube.

6. The apparatus of claim 1, wherein the air flow enhancement device comprises a cooling device connected to an end of the air flow tube, inducing convection flow through the air flow tube.

7. The apparatus of claim 1, wherein the plurality of sensors and the processor are further connected to a vehicle accessory control system, an occupant monitoring system, and/or a neutralizer deployment system.

8. The apparatus of claim 1, further comprising an air filter proximate an inlet of the air flow tube.

9. An apparatus for measuring gas or airborne compound concentration in an enclosure, comprising:
    a flow tube comprising an inlet in fluid communication with ambient air in the enclosure;
    an air filter proximate the inlet of the air flow tube;
    a mounting plane connected inside the flow tube;
    a plurality of sensors mounted on at least one side of the mounting plane and exposed to ambient air flow through the flow tube and the air filter, the sensors configured to detect the concentration of target gases and/or airborne compounds in the ambient air flow; and
    an air flow enhancement device connected to the flow tube;

wherein the mounting plane is a printed circuit board connecting the plurality of sensors to a power source, a processor, and computerized memory storing software that enables the processor to analyze data from the plurality of sensors and identify features of the target gases and/or airborne compounds present in the enclosure;

wherein the plurality of sensors comprises photocatalytic micro-electro-mechanical sensors (MEMS), and wherein the MEMS transmit the data to the processor to sense the target gases and/or airborne compounds concentration in the ambient air flow by detecting differentials in physical responses of the MEMS; and wherein the flow tube defines windows allowing incoming light to enter the flow tube, and the MEMS are photocatalytic MEMS providing the processor with data directed to changes in photoconductivity of the sensors in the presence of target gases.

* * * * *